(12) United States Patent
Wang et al.

(10) Patent No.: US 8,340,646 B2
(45) Date of Patent: Dec. 25, 2012

(54) DIRECT VOICEMAILING

(75) Inventors: Winston Wang, Seattle, WA (US);
Adam Holt, London (GB)

(73) Assignee: T-Mobile USA, Inc., Bellevue, WA (US)

( * ) Notice: Subject to any disclaimer, the term of this patent is extended or adjusted under 35 U.S.C. 154(b) by 595 days.

(21) Appl. No.: 12/434,597

(22) Filed: May 1, 2009

(65) Prior Publication Data
US 2010/0279663 A1 Nov. 4, 2010

(51) Int. Cl.
*H04M 11/10* (2006.01)
(52) U.S. Cl. ............... 455/413; 455/412.1; 455/426.1; 455/518
(58) Field of Classification Search .............. 455/518, 455/426, 413, 412.1; 379/88.22, 88.11, 88.25
See application file for complete search history.

(56) References Cited

U.S. PATENT DOCUMENTS

| | | | |
|---|---|---|---|
| 5,568,540 A | 10/1996 | Greco et al. | |
| 5,781,901 A | 7/1998 | Kuzma | |
| 6,393,107 B1 | 5/2002 | Ball et al. | |
| 6,411,684 B1 | 6/2002 | Cohn et al. | |
| 6,839,411 B1 | 1/2005 | Saltanov et al. | |
| 6,859,213 B1 | 2/2005 | Carter | |
| 7,096,432 B2 | 8/2006 | Huapaya et al. | |
| 7,149,777 B1 | 12/2006 | Rhee | |
| 7,203,286 B1 | 4/2007 | Brockenbrough et al. | |
| 7,212,614 B1 | 5/2007 | Burg et al | |
| 7,263,370 B1 | 8/2007 | Infosino | |
| 7,409,424 B2 | 8/2008 | Parker | |
| 7,447,507 B1 | 11/2008 | Infosino | |
| 7,466,803 B2 | 12/2008 | Burg et al. | |
| 7,512,219 B2 | 3/2009 | Kovales et al. | |
| 7,664,235 B2 | 2/2010 | Hirschberg et al. | |
| 7,756,258 B2 * | 7/2010 | Clift et al. .................. | 379/88.25 |
| 7,899,161 B2 | 3/2011 | Katkam et al. | |
| 2002/0152402 A1 | 10/2002 | Tov et al. | |
| 2004/0105536 A1 | 6/2004 | Williams | |
| 2004/0203678 A1 | 10/2004 | MacNamara et al. | |
| 2004/0248594 A1 | 12/2004 | Wren, III | |
| 2005/0048967 A1* | 3/2005 | Hoglander et al. ........ | 455/426.1 |
| 2006/0265458 A1 | 11/2006 | Aldrich et al. | |
| 2007/0036292 A1 | 2/2007 | Selbie et al. | |
| 2007/0112925 A1 | 5/2007 | Malik | |

(Continued)

FOREIGN PATENT DOCUMENTS

KR 20050021227 A 3/2005
KR 20050082484 A 8/2005

OTHER PUBLICATIONS

International Search Report for PCT/US2010/032392, dated Nov. 10, 2010, from the Korean Intellectual Property Office, 5 pages.

(Continued)

*Primary Examiner* — David Q Nguyen
(74) *Attorney, Agent, or Firm* — Lee & Hayes, PLLC

(57) ABSTRACT

Various exemplary user interfaces, methods, and computer program products describe directly sending a voicemail message to a voicemail box of a receiving telecommunications device without first initiating a synchronous voice communication to the receiving telecommunications device. A sending telecommunications device can record the voicemail message for sending the voicemail message or for subsequent transmission. In some implementations, the voicemail server sends or subsequently transmits based on whether the sending telecommunications device is capable of engaging in an asynchronous communication session.

16 Claims, 11 Drawing Sheets

U.S. PATENT DOCUMENTS

| | | | |
|---|---|---|---|
| 2007/0143495 A1 | 6/2007 | Porat | |
| 2007/0155415 A1* | 7/2007 | Sheehy et al. | 455/518 |
| 2007/0274469 A1 | 11/2007 | Lesko et al. | |
| 2008/0049911 A1* | 2/2008 | Hanson et al. | 379/88.22 |
| 2008/0232557 A1 | 9/2008 | Baird | |
| 2009/0003540 A1 | 1/2009 | Zafar | |
| 2009/0061827 A1* | 3/2009 | Bulgin et al. | 455/413 |
| 2009/0175425 A1* | 7/2009 | Lee | 379/88.11 |
| 2009/0197574 A1* | 8/2009 | Petronelli et al. | 455/412.1 |

OTHER PUBLICATIONS

Non-Final Office Action for U.S. Appl. No. 12/434,603, mailed on Jun. 22, 2011, Winston Wang, "Voicemail with Data Content".

Final Office Action for U.S. Appl. No. 12/434,603, mailed on Dec. 28, 2011, Winston Wang et al., "Voicemail With Data Content", 12 pages.

Non-Final Office Action for U.S. Appl. No. 12/434,603, mailed on Feb. 23, 2012, Winston Wang et al., "Voicemail With Data Content", 10 pages.

Non-Final Office Action for U.S. Appl. No. 12/434,603, mailed on Jun. 1, 2012, Winston Wang et al., "Voicemail With Data Content", 14 pages.

Non-Final Office Action for U.S. Appl. No. 12/434,603, mailed on Sep. 25, 2012, Winston Wang et al., "Voicemail With Data Content", 11 pages.

* cited by examiner

DIRECT VOICEMAILING

BACKGROUND

Over the past thirty years, telephony has significantly evolved from the once-ubiquitous public switched telephone service (PSTN). Telecommunications consumers today have a wide range of telecommunications options to choose from, including traditional landline phone service, IP-based telecommunications services (based on, for example, Voice over Internet Protocol), cellular telecommunications services, and converged telecommunications services (such as Unlicensed Mobile Access or UMA).

Telecommunications devices now consist in a myriad of form factors, such as traditional landline phones, cordless phones, cellular phones, smart phones, PDA phones, desktop and portable computers, media players, home telecommunications hubs, or the like (hereinafter "telecommunication devices"), which have become a ubiquitous part of modern life. Originally, most of these telecommunication devices just provided two-way voice communication between a first person at a first location using a first telecommunication device and a second person at a second location using a second telecommunication device, so that the first person and the second person were able to carry on a conversation. For example, a voice communication or call normally involved real-time, duplex, synchronous voice communications, in which all participants hear the other participants in real time, all participants can simultaneously speak, and all participants are actively engaged and respond directly and immediately to each other without significant interruption.

More recently, telecommunication devices are frequently capable of both voice and data communications, using various modes of such communications. Email, text messages (e.g., Short Message Service or SMS), and multimedia messages (e.g., Multimedia Messaging Service or MMS) are well-known forms of asynchronous data communications. Email was originally used with computers, but is now commonly sent and received through telecommunications devices as well. SMS text messaging has been used for many years in the area of cellular telecommunications. Participants are typically engaged in the communications at different times, and their participation might occur as a number of small, non-contiguous, asynchronous interactions.

In addition to person-to-person communications, many modern telecommunications devices are capable of other types of data communications through access to the Internet and other databases. For example, many telecommunication devices have built-in web browsers for Internet navigation.

It should be noted that both voice and data communications might be implemented using the same wireless and IP-based technologies. In some situations, particularly with conventional cellular or IP-based systems, voice might be communicated using a proprietary cellular protocol, while data and non-voice communications are based on other protocols carried over a cellular and/or an IP-based telecommunications network.

Telecommunications devices vary in complexity and capabilities, from simple devices that support only voice communications, to very sophisticated devices with capabilities of personal computers. Higher-end telecommunication devices are identified to include smart phones but increasingly include desktop and portable computers. These include telecommunication devices that typically have an operating system executed from some form of solid-state memory by one or more processors.

Voicemail is another voice communications mode, in which a caller leaves a recorded message for a recipient. The recipient listens and responds to a voicemail message at his or her leisure. Because of the time lag between leaving the message and actually listening or responding to the message, this communications mode is referred to as asynchronous.

When a telecommunications device has a very weak signal to a voice communication channel, it may be unable to record or send voicemail. With the weak signal, the caller may not be able to articulate in an audible, clear manner, making it difficult for the recipient to accurately hear or understand the voicemail message.

Also, shortly after receiving the voicemail, an immediate notification of the received voicemail may be sent to a receiving telecommunications device. This notification may instigate the recipient to communicate immediately with the caller. However, the caller may not want to communicate directly with the recipient

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
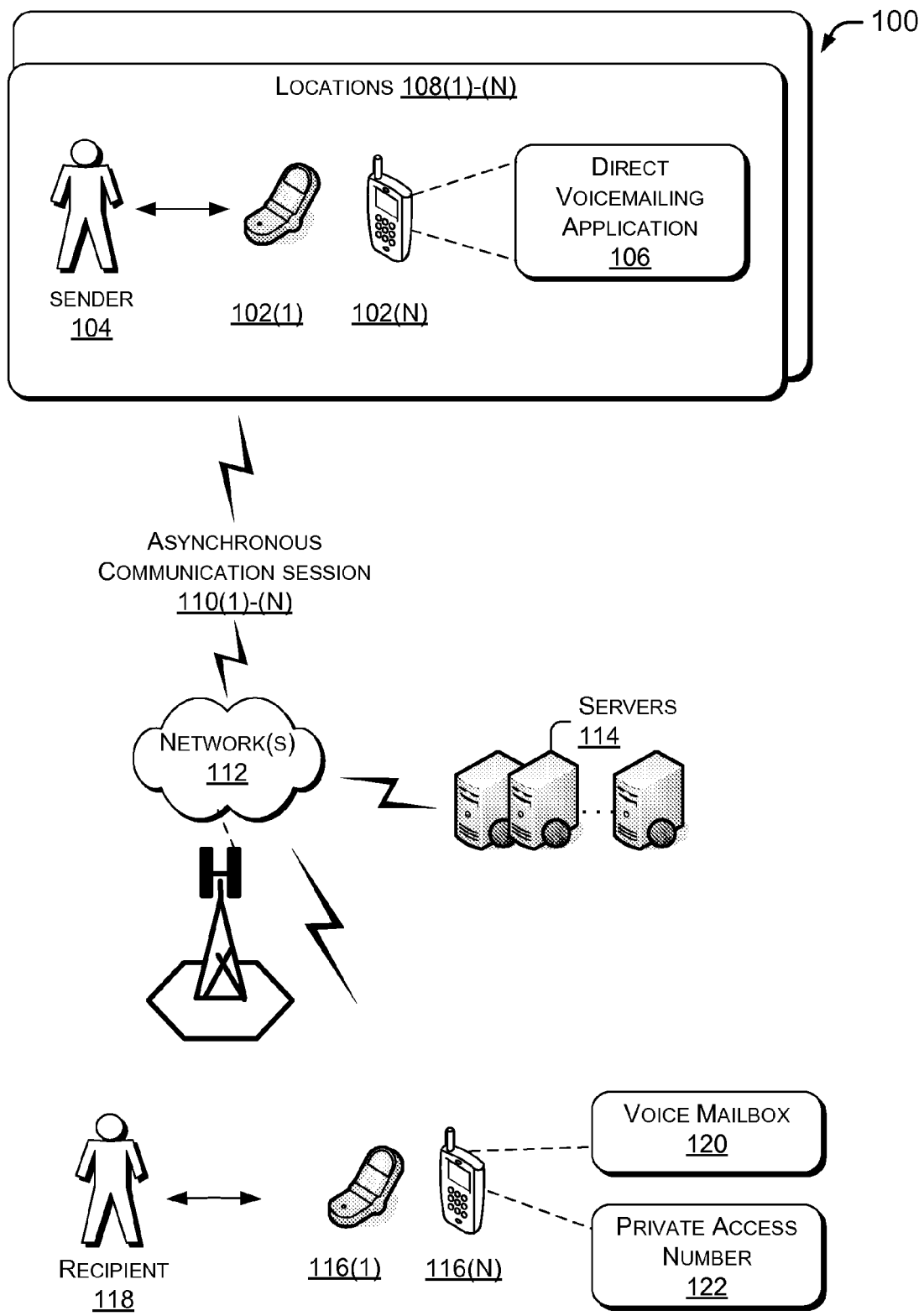
FIG. 1 is a block diagram of an exemplary environment for implementing formation of, directly sending, and receiving a voicemail to a voice mailbox.

This disclosure is directed to techniques for sending voicemail to a receiving telecommunications device without initiating a synchronous voice communication, such as a phone call, to the receiving telecommunications device. A sending telecommunications device records a voicemail message on the sending telecommunications device for sending or subsequently transmitting to a receiving telecommunications device based on determining whether the sending telecommunications device is capable of engaging in an asynchronous communication session.

In some aspects, a voicemail application program is employed to create a voicemail message without having to initiate a synchronous voice communication to a receiving telecommunications device. As part of this creating, the voicemail message is recorded to a remote voicemail server, provided there is an ability to engage in an asynchronous communication session for the sending telecommunications device. For example, the sending telecommunications device may have a connection to a voice communication channel, such that the connection is within a predetermined connection strength range and has permission to access the asynchronous communication session. The voicemail message from the sending telecommunications device is then directly sent to the voice mailbox of the receiving telecommunications device by the remote voicemail server.

In various aspects, the direct voicemailing application program may record and store the voicemail message on the sending telecommunications device when the sending telecommunications device is not able to engage in an asynchronous communication session. For example, the sending telecommunications device may not be able to engage in an asynchronous communication session when the sending telecommunications device does not have a connection to a voice communication channel, such as not being within a predetermined connection strength range (i.e., with weak or no signal/connection strength) or when the sending telecommunications device does not have permission to access the asynchronous communication session. The voicemail message from the sending telecommunications device is subsequently transmitted to the voice mailbox of the receiving telecommunications device when the sending telecommunications device is able to engage in the asynchronous communication session. This makes it convenient for a sender to directly record and store several voicemail messages on the sending telecommunications device, and the program will subsequently transmit the voicemail messages when there is an asynchronous communication session available.

Once the directed voicemail message has been directly sent or subsequently transmitted from the sending telecommunications device and received in the voice mailbox of the receiving telecommunications device, no notification of a received voicemail message in the voice mailbox may be sent to the receiving telecommunications device. In other instances, the recipient may select options to receive notifications or alerts of the directed voicemail message. Furthermore, the recorded voicemail message may be directly sent or subsequently transmitted from the sending telecommunications device to the voice mailbox of the receiving telecommunications device at a scheduled date and a time.

The direct voicemailing applies to many different contexts and environments. By way of example and not limitation, the techniques described herein may be implemented to support directly sending voicemail messages to voice mailboxes without initially calling or ringing the individuals, at universities, hospitals, corporations, offices, court systems, restaurants, sporting events, meetings, and the like. In one example, the direct voicemailing could be used by an airline company to directly send work schedules or assignments for days, times, and flight numbers to the voice mailboxes belonging to the airline employees. In another example, the direct voicemailing could be used by a court system to directly send messages of dates and times to appear in court to voice mailboxes for potential jurors. In another example, the direct voicemailing could be used by medical and dental offices to directly send appointment dates to voice mailboxes of patients. In yet another example, the direct voicemailing could be used by radio, television, or weather stations to directly send weather reports or road conditions to the voicemail boxes of individuals whose occupations may rely on knowing these conditions. Thus, there are many uses in various contexts.

Illustrative Architecture

FIG. 1 is a block diagram of an exemplary architecture 100 in which direct voicemailing may occur between telecommunications devices. The architecture 100 includes exemplary telecommunications devices 102(1), 102(2), . . . , 102(N), which may be implemented in many ways, including, but not limited to, a cellular telecommunications device 102(1), a smart phone, traditional landline phones, cordless phones, cellular telephones, PDA phones, desktop and portable computers, media players, home telecommunications hubs, or any other device capable of engaging in telecommunications. The telecommunications devices 102(1)-(N) are capable of connecting to one or more networks.

In the illustrated example, a caller or a sender 104 accesses an application program, direct voicemailing application 106, that is stored and executed on the sending telecommunications device 102. The term "sender" or "caller" is used to indicate an originator of a communication, regardless of whether the communication consists of a voice call, voicemail, or a non-voice communication (e.g., an instant message).

The sender 104 with the telecommunications device 102 may be mobile and moving continuously around various locations 108(1)-(N). The movement of the telecommunications device 102 affects the ability of the device 102 to engage in asynchronous communication sessions 110(1)-(N). The ability to engage in an asynchronous communication session 110 may be based on one or more factors, such as a determination of whether a connection strength for the telecommunications device 102 to one or more networks, represented by network(s) 112, meets a connection strength range or threshold, and a determination of whether permissions or rules allow the asynchronous communication session. The permissions or rules may be specified on the telecommunications device 102, provided by another device located nearby, or provided by a server. The permissions or rules may be determined by a building that blocks incoming or outgoing communication on the sending telecommunications device 102 (i.e., a movie theater) or an airplane that prevents sending telecommunications device 102 connections with cell towers, even though the cell towers may be visible.

It will be understood that, although network(s) 112 are represented by a single cell tower commonly associated with a cellular telecommunications network, the network(s) 112 represents any type of telecommunications network(s), including cellular telecommunications networks, IP-based telecommunications networks (e.g., Voice over Internet Protocol networks), traditional landline or POTS networks, or combinations of the foregoing (e.g., Unlicensed Mobile Access or UMA networks, the circuit-switched telephone networks or IP-based packet-switch networks). The network(s) 112 may also include wire-based networks (e.g., cable) and wireless networks (e.g., cellular, satellite, etc.). The network(s) 112 may use any number of protocols and configurations to enable the sending telecommunications devices 102(1)-(N) to access other telecommunications devices and resources.

The sending telecommunications device 102 monitors varying connection strengths on the network(s) 112, based on the locations 108(1)-(N) of the sending telecommunications device 102. For example, each location 108 may be in proximity to zero, one, or more cellular towers or wireless access points, and the connection strength may vary based on the number of cellular towers or wireless access points in proximity to the location 108. In an implementation, the sending telecommunications device 102 may have a weak or no connection strength, causing the sender 104 to record a directed voicemail message locally on the sending telecommunications device 102 for subsequent transmission to a voice mailbox of a telecommunications device for a recipient.

In another implementation, if the sending telecommunications device 102 has a connection strength that is within a predetermined connection strength range, such as within a frequency band about 850 to 900 MHz and about 1850 to 1990 MHz, the sender 104 may record a directed voicemail message to a remote voicemail server 114, which then directly sends the voicemail to a voice mailbox.

In a further implementation, if the sending telecommunications device 102 has a connection strength that exceeds a threshold (e.g., a certain number of bars shown on a user interface to sender 104 or a metric similar to the bars), the sender 104 may record a directed voicemail message to a remote voicemail server 114, which then directly sends the voicemail to a voice mailbox.

The remote voicemail server 114 is a representative set of one or more servers that is accessible via the network 112. The servers 114 may be configured as any suitable system capable of implementing the direct voicemailing application 106 to serve information and programming to the sending telecommunications device 102 and to a receiving telecommunications device 116. For example, the remote voicemail server 114 may directly send the directed voicemail message from the sending telecommunications device 102 to the voice mailbox 120 of a recipient 118. A recipient or a receiver is a person or an entity receiving the communication, such as direct voicemailing.

In an implementation, the sending telecommunications device 102 is able to directly send the voicemail message when there is a connection strength within a connection strength range or meeting or exceeding a threshold. The connection strength permits the sender 104 to record the voicemail message to the remote voicemail server 114.

In another implementation, the sending telecommunications device 102 will subsequently transmit a directed voicemail message to the voice mailbox 120 when there is a weak connection or no connection strength, such as when the connection strength is not within the predetermined connection strength range. Upon determining the connection strength for the sending telecommunications device 102 is not within the connection strength range, the sender 104 records the directed voicemail message on the sending telecommunications device 102.

Figure 11:
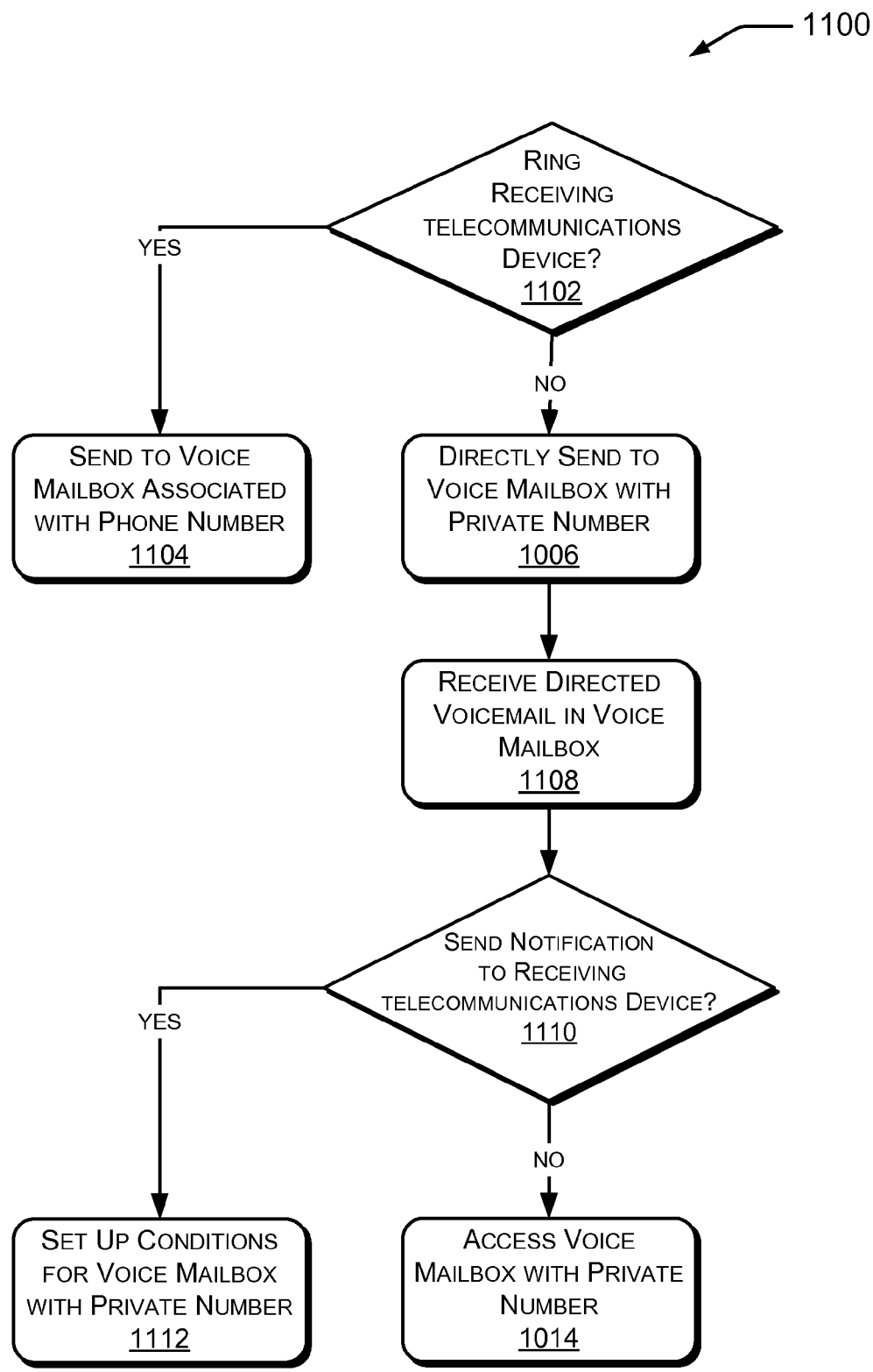
FIG. 11 is a block diagram of a flowchart showing an exemplary process for directly sending and receiving the direct voicemailing.

In an implementation, the direct voicemailing application 106 may provide options or selections to send a synchronous voice communication or to send an asynchronous communication, such as a directed voicemail, to the receiving telecommunications device 116. For a synchronous voice communication to the telecommunications device 116, if the recipient 118 is not available, the sender 104 may leave a traditional voicemail. In this implementation, the recipient's voice mailbox 120 has a same telecommunications number as a number for the receiving telecommunications device 116. For direct voicemailing, the directed voicemailing mailbox 120 for the receiving telecommunications device 116 may be assigned a private access telecommunications number 122 that is different than the telecommunications number for the receiving telecommunications device 116. Furthermore, the assigned private access telecommunications number 122 is not shown to the sender 104 when the sender 104 is directly sending the voicemail on the sending telecommunications device 102. A detailed discussion of this implementation is shown in FIG. 11 and described below.

In another implementation, the receiving telecommunications device 116 may have only one voicemail, a voicemail associated with directed voicemailing so that the recipient 118 can avoid being disturbed with an initial synchronous call or a notification of a received voicemail. The directed voicemailing provides privacy for the recipient 118 who may not want to be disturbed with synchronous voice communication or asynchronous communication, such as voicemail notifications sent during meetings or while on vacation. The directed voicemail application 106 allows the sender 104 to directly send or subsequently transmit the voicemail message from the sending telecommunications device 102 to the voicemail 120 of the receiving telecommunications device 116, rather than dealing directly with an unpleasant conversation or encountering a possible confrontation with the recipient 118.

The architecture 100 shows that the recipient 118 may have access to voice mailbox 120 in the receiving telecommunications device 116 in a representative landline or wireless environment accessible via the network 112. The receiving telecommunications device 116 for the recipient 118 may be landline or wireless telecommunications devices, part of a business enterprise, part of a stand-alone environment, or a combination of the above.

Exemplary Telecommunications Device Implementation

Figure 2:
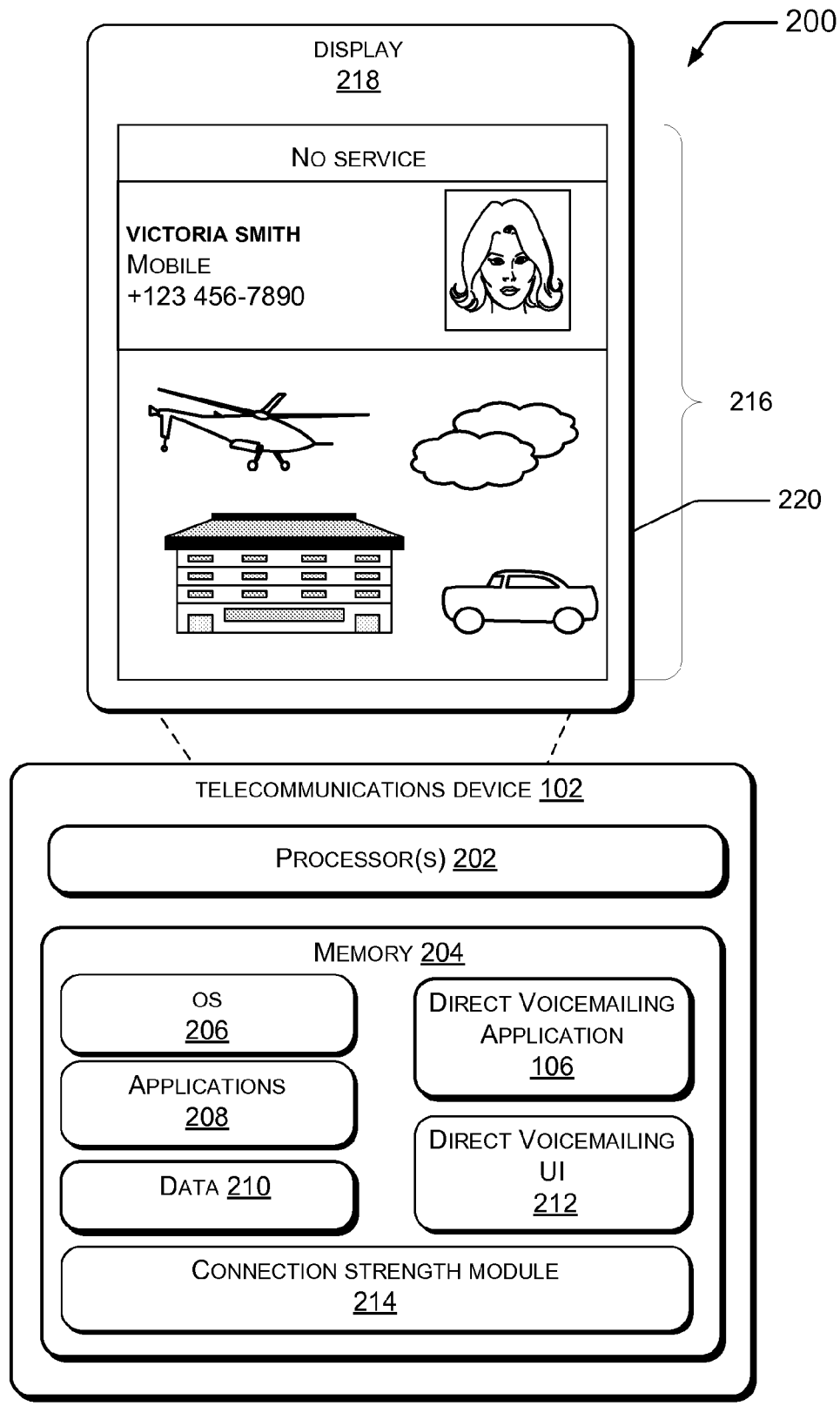
FIG. 2 is block diagram showing an exemplary telecommunications device and a user interface for the direct voicemailing of FIG. 1.

FIG. 2 shows a detailed system 200 of an exemplary sending telecommunications device 102 of FIG. 1. The system 200 includes a processor 202 and a memory 204. The memory 204 is representative of different types of memory, such as volatile and non-volatile memory. An operating system 206 is stored in the memory 204 and executable on the processor 202. The memory may also store other applications 208 and data 210.

The direct voicemailing application 106 is also stored in the memory 204 and executable on the processor 202. As described above, the direct voicemailing application 106 is configured to record voicemail messages, convert the received audio signals of sender 104 into a digital voicemail message, store the voicemail locally for subsequent transmission, transmit the voicemail as it is received or immediately after reception, and/or facilitate the sender 104 in scheduling a date and time for the subsequent transmission.

Upon receiving an indication that the sender 104 desires to record a voicemail for direct sending or subsequent transmission, the direct voicemailing application 106 begins recording the voicemail locally on the sending telecommunications device 102. In some implementations, the direct voicemailing application converts the voicemail to digital form and streams it to a remote voicemail server 114 and/or voice mailbox 120 of a receiving telecommunication device 116 as the voicemail is being recorded. In other implementations, the direct voicemailing application 106 waits until completion of the recording before converting the voicemail to digital form and/or sending it to a remote voicemail server 114 and/or voice mailbox 120 of a receiving telecommunications device 116. In some implementations, the recorded voicemail may be stored in the memory 204 of the sending telecommunications device 102.

As described above and below, the direct voicemailing application 106 may directly send or subsequently transmit the recorded voicemail based on the connection strength of the sending telecommunications device 102. In an implementation, the connection strength is determined by a connection strength module 214, described further below. The direct voicemailing application 106 may then compare the connection strength ascertained by the connection strength module 214 to a predetermined connection strength range, such as within a frequency band about 850 to 900 MHz and about 1850 to 1990 MHz, or to a threshold. The range may be set by the sender 104, programmed into the direct voicemailing application 106, or provided to the sending telecommunications device 102 by, for example, the remote voicemail server 114.

If the ascertained connection strength is within the range or meets or exceeds the threshold, the direct voicemailing application 106 directly sends the voicemail to the remote voicemail server 114, then in turn sends it to the voice mailbox 120 of the receiving telecommunications device 116.

If the connection strength is not within the range or does not meet the threshold, the direct voicemailing application 106 stores the voicemail locally and subsequently transmits the voicemail to the remote voicemail server 114 and/or the voice mailbox 120 of the receiving telecommunication device 116. In some implementations, the direct voicemailing application 106 offers the sender 104 the option of scheduling a date and time for the subsequent transmission. Upon the occurrence of that date and time, the direct voicemailing application 106 then ascertains the connection strength and, if the strength is within the range or meets/exceeds the threshold, the direct voicmailing application 106 transmits the message.

In an implementation, if the sending telecommunications device has a mode for operating without connectivity, such as an "airplane mode", the direct voicemailing application 106 behaves as if the connection strength is not within the predetermined range or does not meet the threshold automatically, without ascertaining the connection strength.

Also stored in the memory 204 is a direct voicemailing user interface (UI) module 212 that is implemented as part of the direct voicemailing program 106. For purposes of illustration only, the sender 104 operates the telecommunications device 102 with the screen and other interface features which allow for the functionality described herein.

When executed by the processor 202, the UI module 212 presents the UI 216 on the display 218. In this example, the direct voicemailing UI 216 covers all of the available screen area of the display 218, although in other implementations, it may be configured to cover less than the entire screen area. Shown at 220 is a photograph saved on the UI 216 of the sending telecommunications device 102.

The user interface module 212 presents the sender 104 with options for performing the functionalities of direct voicemailing application 106, such as recording the voicemail message, viewing if there is a connection strength in operation with the connection strength module 214, setting a date and time to send the directed voicemailing, illustrating contacts on a list, and other processes.

The connection strength module 214 is able to determine if the telecommunications device 102 is able to engage in an asynchronous communication session 110. For example, the module 214 determines the connection strength for the telecommunications device 102. Mechanisms for determining connection strengths are well known in the art. Accordingly, the connection strength module 214 will not be described further.

The user interface 216 would present the connection strength on the sending telecommunications device 102. In particular, the sender 104 would activate the Record function to record a voice mail message. In an implementation, after recording, the record function would save the recorded voice mail to the sending telecommunications device 102, if there is "No Service" shown on the user interface 216 for the sending telecommunications device 102.

The user interface 216 may present a connection strength that is within the range. The sender 104 would activate the Record function to record the voice mail message. In an implementation, the recording would occur at the remote voicemail server 114, since there is service for the sending telecommunications device 102.

Software implementations of the processor 202 may include computer-executable instructions to perform the direct voicemailing processes. The instructions are encoded and executed on the processor 202 to perform acts: such as creating the direct voicemailing message, recording the voicemail to the remote voicemail server 114, recording the voicemail to the sending telecommunications device 102, directly sending the voicemail message to the voicemail, subsequently transmitting the voicemail message, determining whether the telecommunications device 102 may engage in an asynchronous communication session 110, determining a connection strength for the telecommunications device 102, comparing the connection strength for the telecommunications device 102 to a range or a threshold, determining whether permissions or rules exist to allow a communication session, determining whether to initially call the telecommunications device 116 or to send a direct voicemailing, and other acts, described above.

The memory 204 stores the operating system 202 and one or more application programs 106 that are accessible by and executable on the processor 202. The memory 204 may store programs of instructions that are loadable, embedded, or encoded, and executable on the processor 202, and data generated during the execution of these programs.

Exemplary Server Implementation

Figure 3:
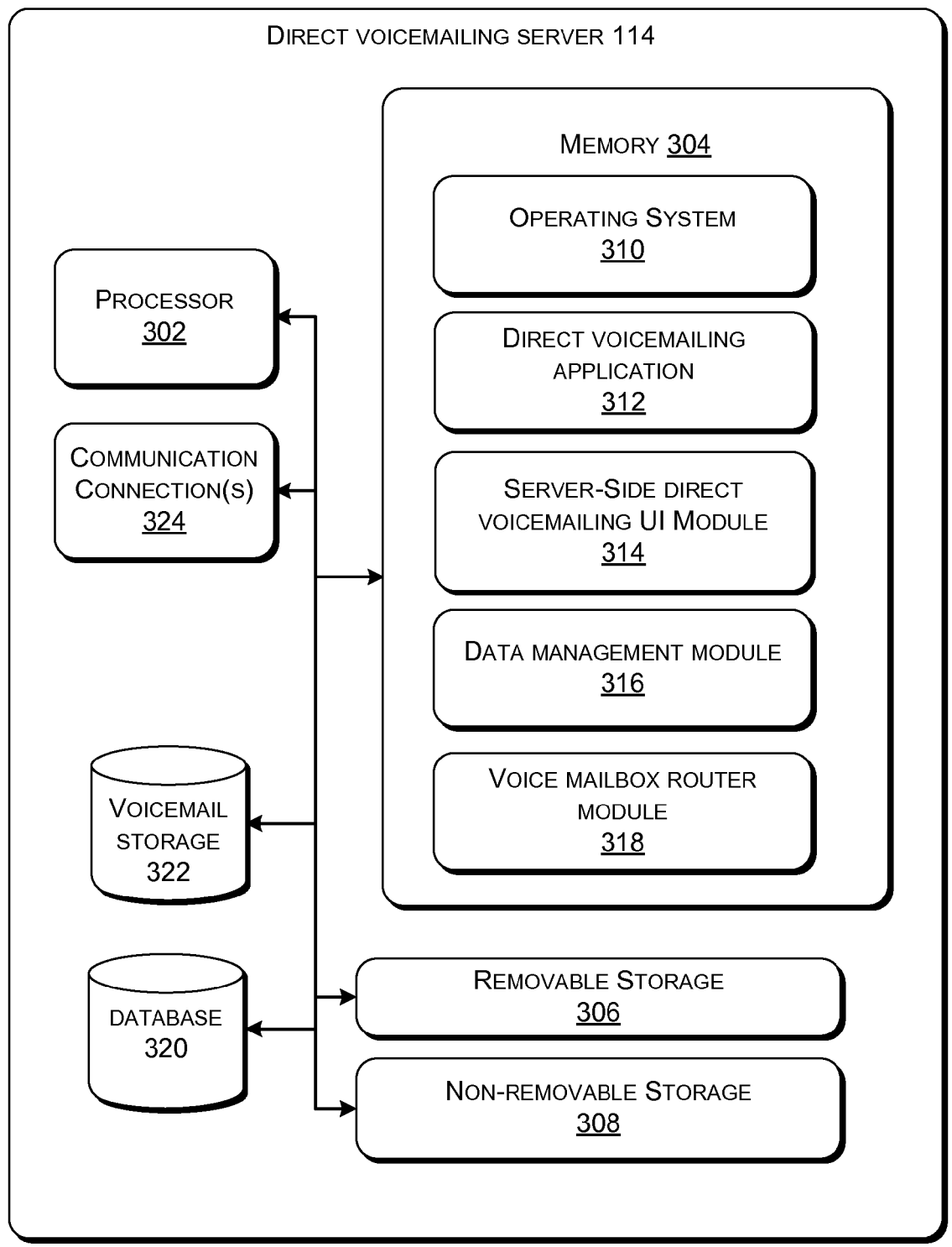
FIG. 3 is a block diagram showing an exemplary direct voicemailing server of the system.

FIG. 3 is a schematic block diagram of an exemplary operating direct voicemailing server 114. The direct voicemailing server 114 may be configured as any suitable system capable of implementing the direct voicemailing application program. In one exemplary configuration, the direct voicemailing server 114 comprises at least one processor 302 and a memory 304. The processor 302 may include computer-executable instructions to perform the direct voicemailing application program. For example, the instructions are encoded and executed on the processor 302 to perform acts such as creating the direct voicemailing message, recording the voicemail to the remote voicemail server, recording the voicemail on the sending telecommunications device 102 when there is no signal, directly sending the voicemail message to the voicemail, subsequently transmitting the voicemail message, determining whether the telecommunications device 102 is able to engage in an asynchronous communication session 110, determining a connection strength for the telecommunications device 102, determining whether permissions or rules exist to allow a voice communication session, displaying the voicemail messages that are recorded and stored, receiving the voicemail message in voice mailbox 120 without a notification, assigning a private access number 122, associating the private access number with the direct voicemailing, initially initiating a synchronous call to the telecommunications device, sending a direct voicemail, and other acts, described above.

Turning to the contents of the memory 304 in more detail, the memory 304 may store computer instructions that are loadable, embedded, or encoded, and executable on the processor 302. The direct voicemailing server 114 may also include additional removable storage 306 and/or non-removable storage 308.

The memory 304 may include an operating system 310 and one or more application programs for implementing all or a part of the direct voicemailing method. In one implementation, the memory 304 includes the direct voicemailing application program 312, a server-side direct voicemailing user interface module 314, a data management module 316, and a voice mailbox router module 318.

The server-side direct voicemailing UI module 314 presents the sender 104 with a graphical user interface 216 for the direct voicemailing method. In an implementation, the graphical user interface 216 offers an activation bar to send direct voicemail, without initially ringing the telecommunications device. The sender user interface 216 is described in greater detail and is illustrated in FIGS. 4-9.

The server-side direct voicemailing UI module 312 also presents the recipient 118 with a graphical user interface for direct voicemailing on the receiving telecommunication device 116, including presenting a recipient user interface to provide access to the voicemail, to display the voice mailbox 120, to display the voicemail message, to display a time and a date of delivery of the voicemail message in the voice mailbox 120 of the receiving telecommunications device 116, to receive a notification of direct voicemail, and other acts.

The data management module 316 stores and manages information, such as voicemail messages or instructions in voicemail storage 322, files, folders, applications, photographs, text messages, instructions, and the like in the database 320, and may communicate with one or more local and/or remote databases or services, such as a direct voicemailing service.

The functions or instructions described may be stored and managed by the database 320, the voicemail storage 322, or the voice mailbox router 318. The database 320 or the voicemail storage 322 may map senders 104 or recipients 118 to instructions configured to user settings for the telecommunications device or commands activated by an indicator or an activation control bar located on the user interface of the telecommunications device 102/116. The database 320 or the voicemail storage 322 includes instructions on how to proceed when a synchronous voice call is made to the number associated with the telecommunications device and traditional voicemail and when an asynchronous communication is made to the private number 122 associated with direct voicemail.

For example, the database 320 or voicemail storage 322 has instructions to transmit the synchronous voice communication by initially ringing the telecommunications device 116 of the recipient 118, and then forward the sender 104 to the traditional voice mailbox, if the recipient 118 is not available to receive the synchronous voice communication. In another implementation, the database 320 or voicemail storage 322 has instructions through user settings or through the activation bar to send the asynchronous communication to direct voice mailbox, without initiating a synchronous voice communication with the telecommunications device.

The voice mailbox router module 318 interacts with the UI module 314, the data management module 314, the database 320, and the voicemail storage 322 to perform traditional and direct voicemailing functions. The voice mailbox router module 318 identifies the voice mailboxes 120 to route voicemail messages to, based on the instructions of user settings or commands of the activation bar or the indicator on the user interface of the telecommunications device 102/116. For example, the receiving telecommunications device 116 may have a private access telecommunications number 122 for asynchronous communication, (i.e., direct voicemailing method) and a different telecommunications number for synchronous voice communication and typical voicemailing. The traditional voice mailbox has the same number as the ringing phone number of the receiving telecommunications device 116. Upon receiving a call to the number associated with the receiving telecommunications device 116, the instructions stored and managed in the database 320 or the voicemail storage 322 are followed by the voice mailbox router module 318 to route the voicemail message to the traditional voice mailbox. Upon receiving communication to the private access number 122, the instructions stored and managed in the database 320 or the voicemail storage 322 are followed by the voice mailbox router module 318 to route the voicemail to the direct voice mailbox. Furthermore, the voicemail router module 318 routes communication to the respective voice mailboxes 120 and identifies whether to send a notification of the received voicemail message. Notifications of the direct voicemail received, may or may not be sent to the recipient, depending on the user instructions. A default position is to not send notifications, unless the recipient 118 modifies the user settings to receive them.

In an implementation, the voice mailbox router 318 routes voicemail based on an architectural framework, an IP multimedia Subsystem (IMS), that merges Internet technologies with telecommunications. For example, the telecommunications device 102 would access an IMS network through the server 114 that supports the IMS network. In data packets to be transmitted, the data is preceded by header information, which may include sender's and recipient's addresses, a protocol to govern the data, and other types of formats. For example, the header information may include instructions or the location in appropriate syntax of email address, for transmitting the asynchronous communication, such as to the direct voice mailbox. In yet another implementation, the header information may include the phone number of the recipient telecommunications device and an indication of whether a call or a message is a traditional voicemail message or a direct voicemail. Based on the header information, the above mentioned instructions are invoked on how to transmit the traditional voicemail or the direct voicemail.

The server 114 may also contain communications connection(s) 324 that allow the processor 302 to communicate with servers, the user terminals, and/or other devices on the network 112.

The server 114 may also include input device(s) such as a keyboard, mouse, pen, voice input device, touch input device, etc., and output device(s), such as a display, speakers, printer, etc. All these devices are well known in the art and need not be discussed at length here.

Exemplary User Interface Implementations

FIGS. 4-9 illustrate exemplary sender user interfaces that are usable with the direct voicemailing shown in FIG. 1. Some telecommunications devices have large touch-screen interfaces, alpha-numeric keypads, and other forms of input and display. The user interfaces described below are shown with a touch-screen interface, but any type of interface is available.

Figure 4:
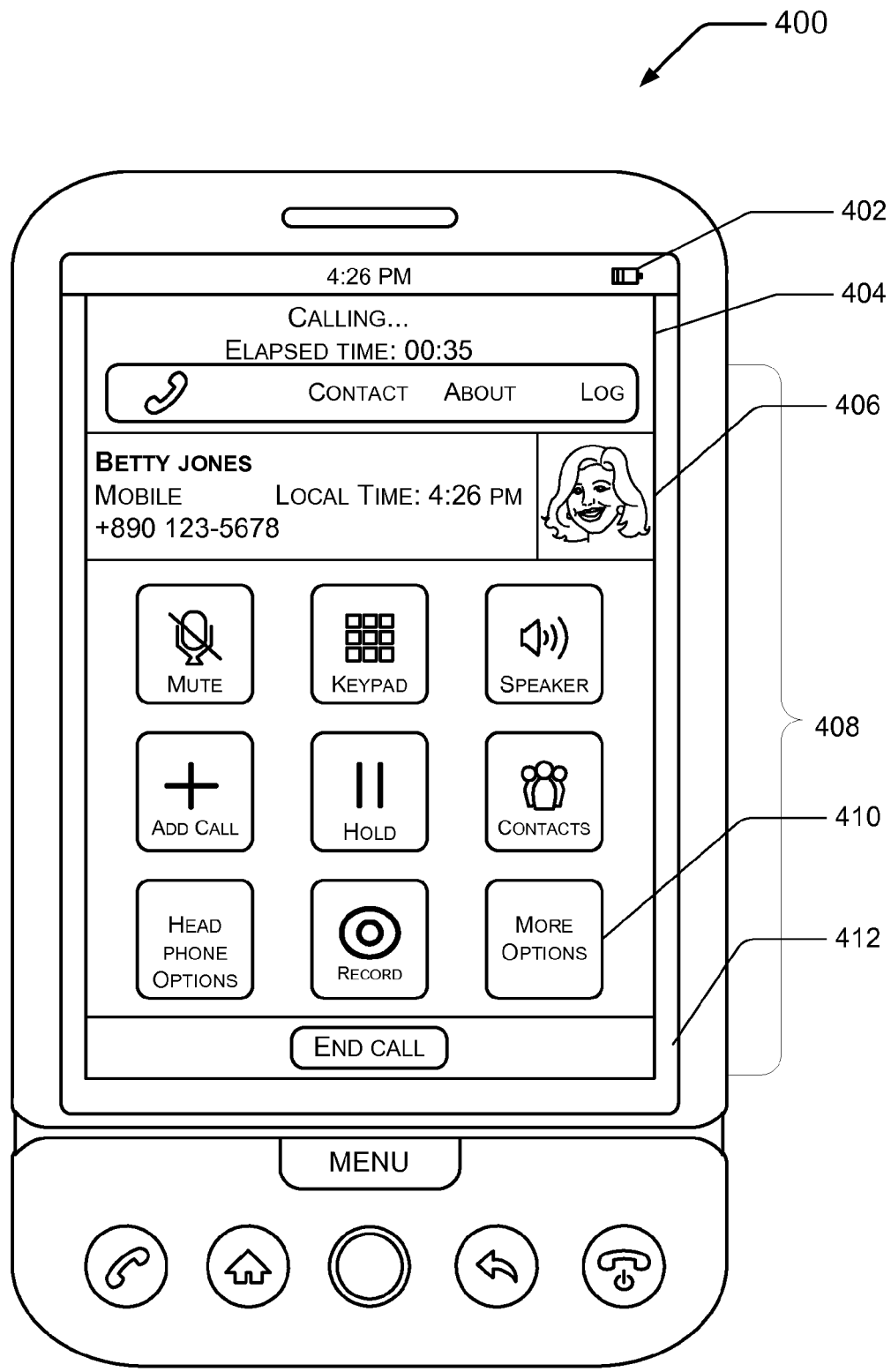
FIG. 4 is a schematic showing an exemplary sender user interface with options available for direct voicemailing.

FIG. 4 shows the sender user interface 400 for direct voicemailing on the sending telecommunications device 102. The user interface 400 shows a title to indicate there is "No Service", indication that the sending telecommunications device 102 is not able to engage in an asynchronous communication session, and the time of 4:26 pm at 402 for the sending telecommunications device 102.

The user interface 400 also shows a bar to illustrate the activity and the time utilized for the activity 404 for the sending telecommunications device 102. The sender 104 is attempting to communicate with the recipient 118 through the sending telecommunications device 102 as shown by "Calling" 404. The user interface 400 also shows the sender 104 has been trying to communicate with the recipient 118 for about 35 seconds as indicated by "Elapsed Time of 35 seconds" 404.

The user interface 400 shows a name and a representation of the recipient 118, such as name, a local time, and a telecommunications number of the recipient 406 as well as a photograph of the recipient 118 on the sending telecommunications device 102.

The user interface 400 shows the various functions 408 offered that may be applicable for direct voicemailing on the sending telecommunications device 102. In particular, the sender 104 would activate the Record function that is shown along row 410, to record a voice mail message. After recording, the record function would save the recorded voice mail to the sending telecommunications device 102, since there is "No Service" for the sending telecommunications device 102.

The user interface 400 illustrates that the sender 104 may select "End Call" 412 on the sending telecommunications device 102. If the sender 104 decides to no longer try to contact the recipient 118, the sender 104 would activate the End Call 412 feature, and if the sender 104 decides to continue, the voicemail application offers an option shown in FIG. 5.

Figure 5:
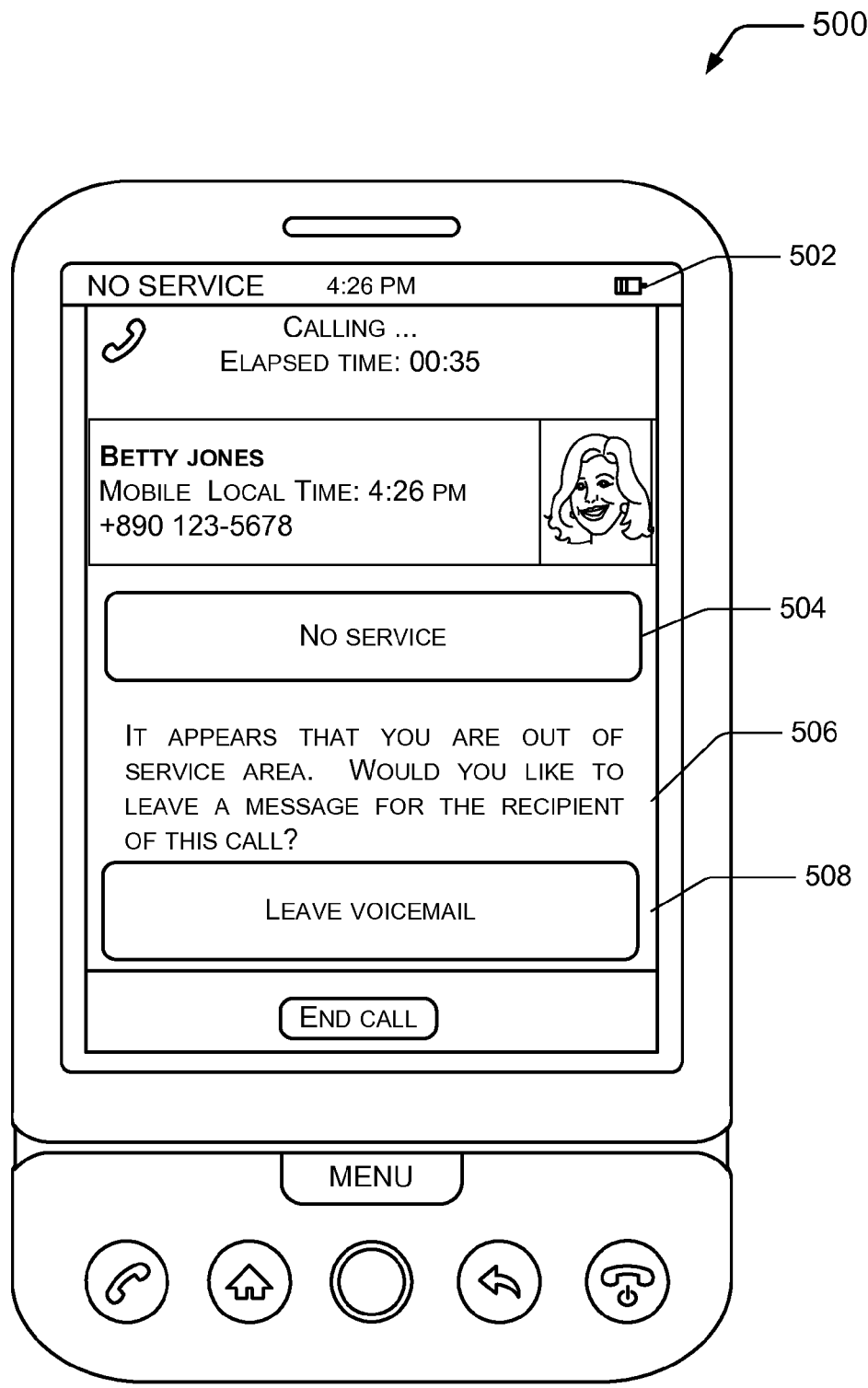
FIG. 5 is a schematic showing an exemplary sender user interface for leaving a voicemail for direct voicemailing.

FIG. 5 illustrates an exemplary sender user interface 500 for specifying whether to leave voicemail for direct voicemailing on the sending telecommunications device 102. The user interface 500 shows a title to indicate there is "No Service" and the time of 4:26 pm at 502 on the sending telecommunications device 102. Furthermore, the user interface 500 indicates to the sender 104 that there is "No Service" 504 on the sending telecommunications device 102. Along with this indication is a message 506 stating that "It appears that you are out of service area. Would you like to leave a message for the recipient of this call?" on the sending telecommunications device 102.

In an implementation, once it is established there is No Service 504 along with the message 506 displayed to the sender 104, the user interface 500 for direct voicemailing program 106 offers the sender 104 an option 508 to "Leave Voicemail" as shown on the sending telecommunications device 102. The sender 104 may activate the Leave Voicemail feature 508 to leave a direct voicemail by recording locally on the sending telecommunications device 102 for subsequent transmission.

Figure 6:
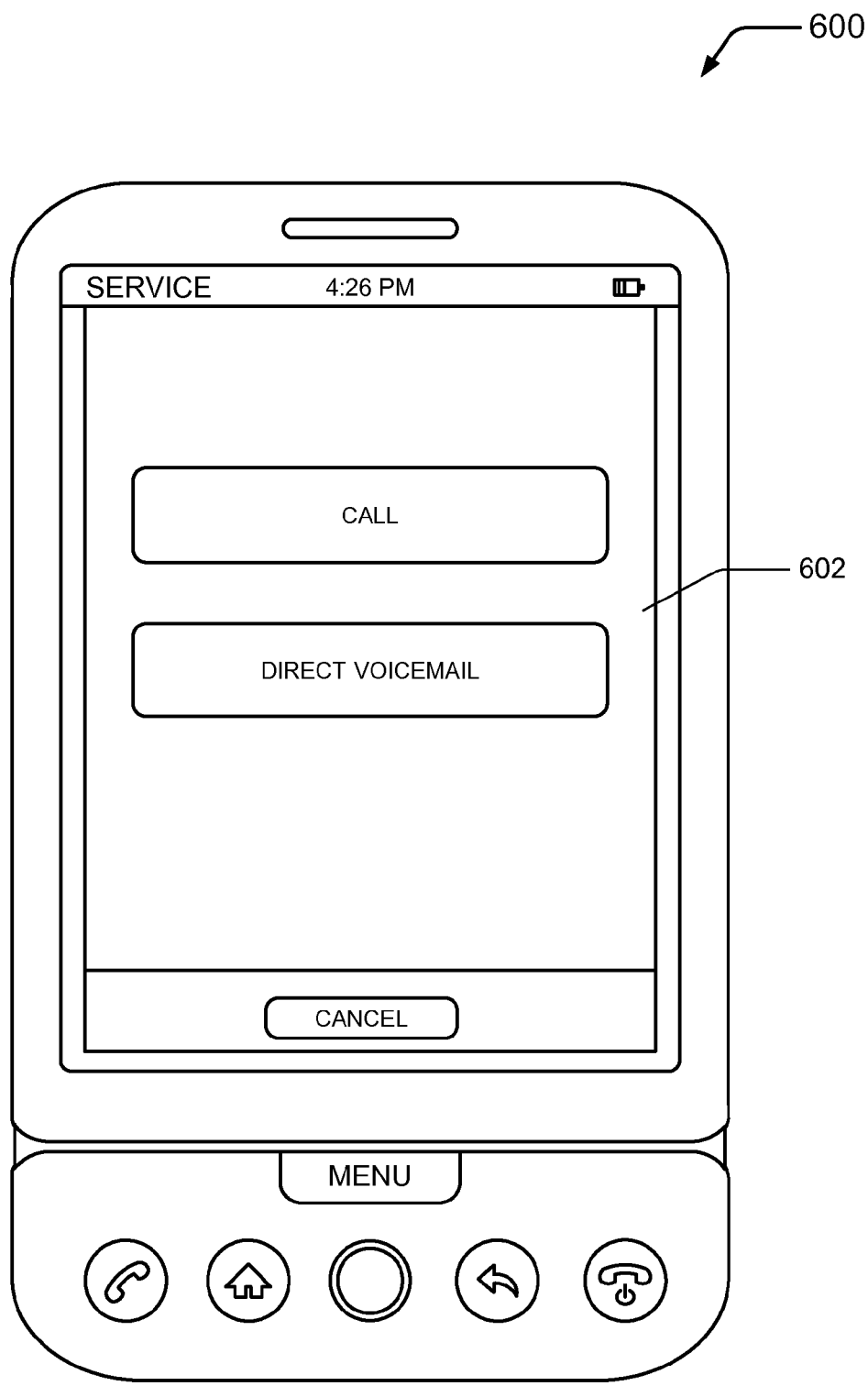
FIG. 6 is a schematic showing an exemplary sender user interface for selecting an option for creating direct voicemailing.

FIG. 6 shows an exemplary sender user interface 600 for direct voicemailing on the sending telecommunications device 102. Shown is the user interface 600 usable for selecting options to Call or to send a Direct Voicemail 602. If the sender selects the Direct Voicemail feature, the user interface would show an indication that "It appears that you would like to leave a voicemail for the recipient?". If it appears the sender 104 desires to leave a voicemail for the recipient 118, the sender 104 creates the direct voicemail. The user interface 600 permits the sender 104 to create a "directed" voicemail message, by recording the directed voicemail message by voice communication on the sending telecommunications device 102. The term "directed" is used to illustrate this voicemail message is for a directed voicemail message without initiating a synchronous call to the recipient telecommunications device 116. The user interface 600 shows a touch control or activation button for the sender 104 to record a voice message locally on the sending telecommunications device 102. As mentioned previously, the application 106 may wait until completion of the recording before converting the voicemail to digital form and sending it to a remote voicemail server 114 and/or the voice mailbox 120 of the receiving telecommunications device 116. In other implementations, the application 106 may covert the voicemail to digital form and streams it to the remote voicemail server 114 and/or voice mailbox 120 as it is being recorded.

Once the sender 104 is satisfied with the voicemail, the sender 104 may activate a touch control or activation bar to "Send To Direct Voicemail" (not shown). If the sender 104 has recorded the message and has activated the "Send To Direct Voicemail" touch bar, the user interface may indicate the message is being sent to the remote voicemail server 114 and/or the direct voice mailbox, associated with the private number.

Figure 7:
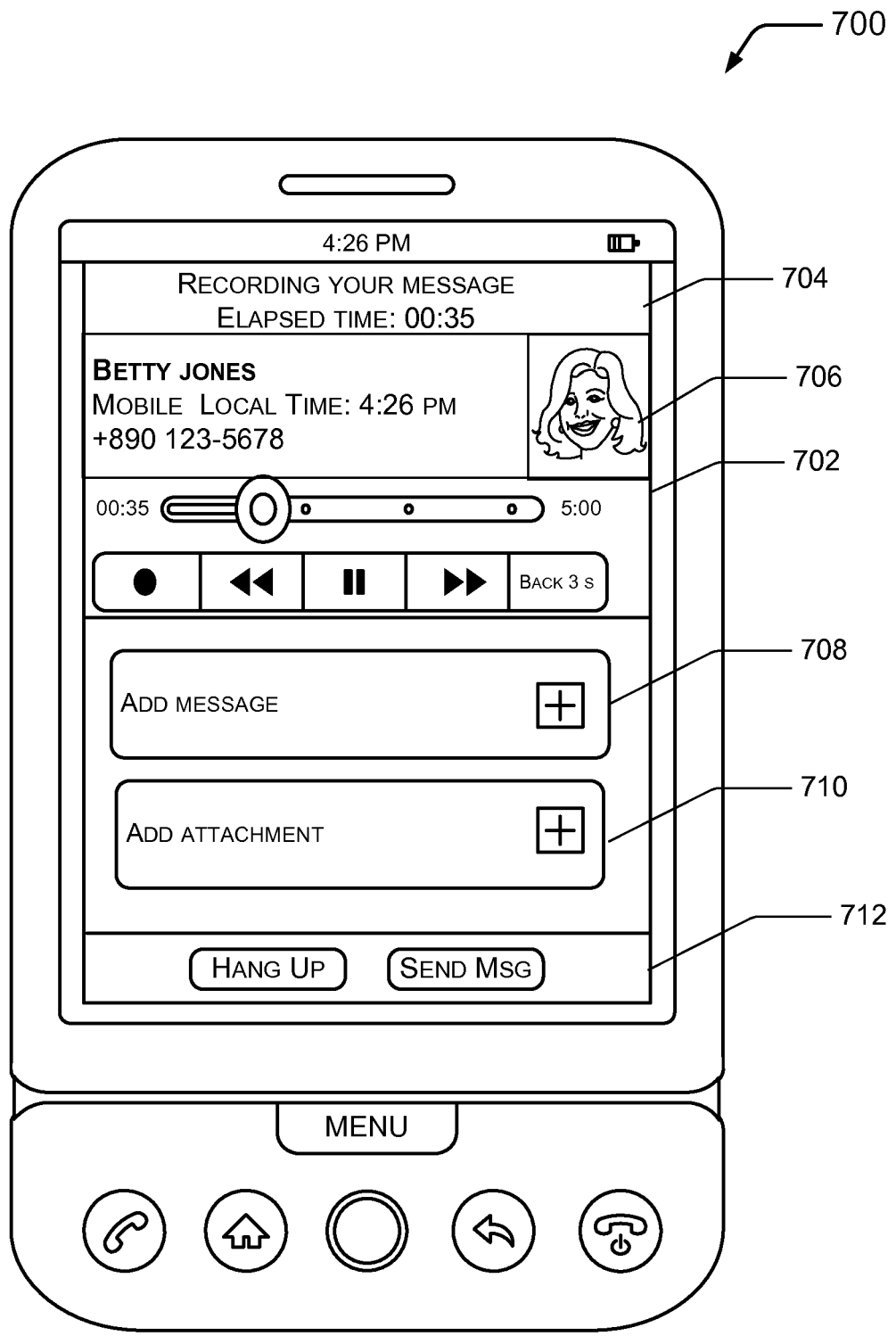
FIG. 7 is a schematic showing an exemplary sender user interface for creating a message or attaching content for direct voicemailing.

FIG. 7 shows an exemplary sender user interface 700 usable by a sender 104 to record the voicemail message and to attach content to the voicemail message for direct voicemailing on the sending telecommunications device 102. In this example, the user interface 700 includes a visual voicemail bar 702 that a sender 104 can use to record and edit a voicemail message. The visual voicemail bar 702 includes controls to record, play, pause, fast forward, rewind, and skip back a predetermined time (3 seconds in this example). The visual voicemail bar 702 also includes a progress bar illustrating a length of the recording in relation to a total available recording length.

The user interface 700 also includes a title bar 704 to illustrate the current activity and the time utilized for the activity 704. In the illustrated example, the title bar 704 indicates that the telecommunications device 102 is "Recording Your Message", and that this activity has been in progress for an "Elapsed Time" of 35 seconds of recording.

The user interface 700 can also include an identification bar 706, including a name and a representation of the recipient 118, such as a photograph of the recipient 118, as well as a local time and a telephone number of the recipient 118.

The user interface 700 also includes an "Add Message" field with an icon 708, by which the sender 104 can enter a greeting, a title, a description, or other text message to attach to the voicemail. Selection of the Add Message field 708 may cause a touch screen keypad (not shown) to be overlaid over a portion of the user interface, so that the sender 104 can type in a desired text message. For example, the sender 104 could identify a subject of the voicemail, thereby providing the recipient 118 of the voicemail with an idea of what the voicemail is about.

The user interface 700 also includes an "Add Attachment" field with an icon 710, by which the sender 104 can signify that content is to be attached to the voicemail that is sent directly or subsequently transmitted to the direct voice mailbox. The content may include content stored in memory of the telecommunications device 102 and/or content stored on a network server, content available on the Internet, and/or content stored on any other storage devices accessible by the telecommunications device 102. Additional details of how content information may be attached directly to voicemail may be found in a co-pending application entitled "Voicemail With Data Content", Ser. No. 12/434,603, filed concurrently with this application.

The user interface 700 illustrates the sender 104 may select Hang Up or Send the Message (Msg) 712 on the sending telecommunications device 102. If the sender 104 decides to not send the directed voicemail message, the sender 104 would activate the Hang Up feature, 712 and if the sender 104 decides to directly deliver the directed voicemail message to the voice mailbox of the receiving telecommunications device 116, the sender 104 would activate the Send Message (msg) feature 712.

In an implementation, when there is no connection, the sender 104 may be able predict when the voicemail message will be delivered from the sending telecommunications device 102 to the voice mailbox of the receiving telecommunications device. This prediction is based on moving the sending telecommunications device 102 to a location with a connection strength falling within a predetermined range. For example, the sender 104 may be in a remote camping site with no network around, record several voicemail messages on the sending telecommunications device 102, and will be able to predict when the voicemail messages will be subsequently transmitted from the sending telecommunications device 102 to the voice mailboxes. This may occur when the sending telecommunications device 102 is moved to a location with telecommunications services.

Figure 8:
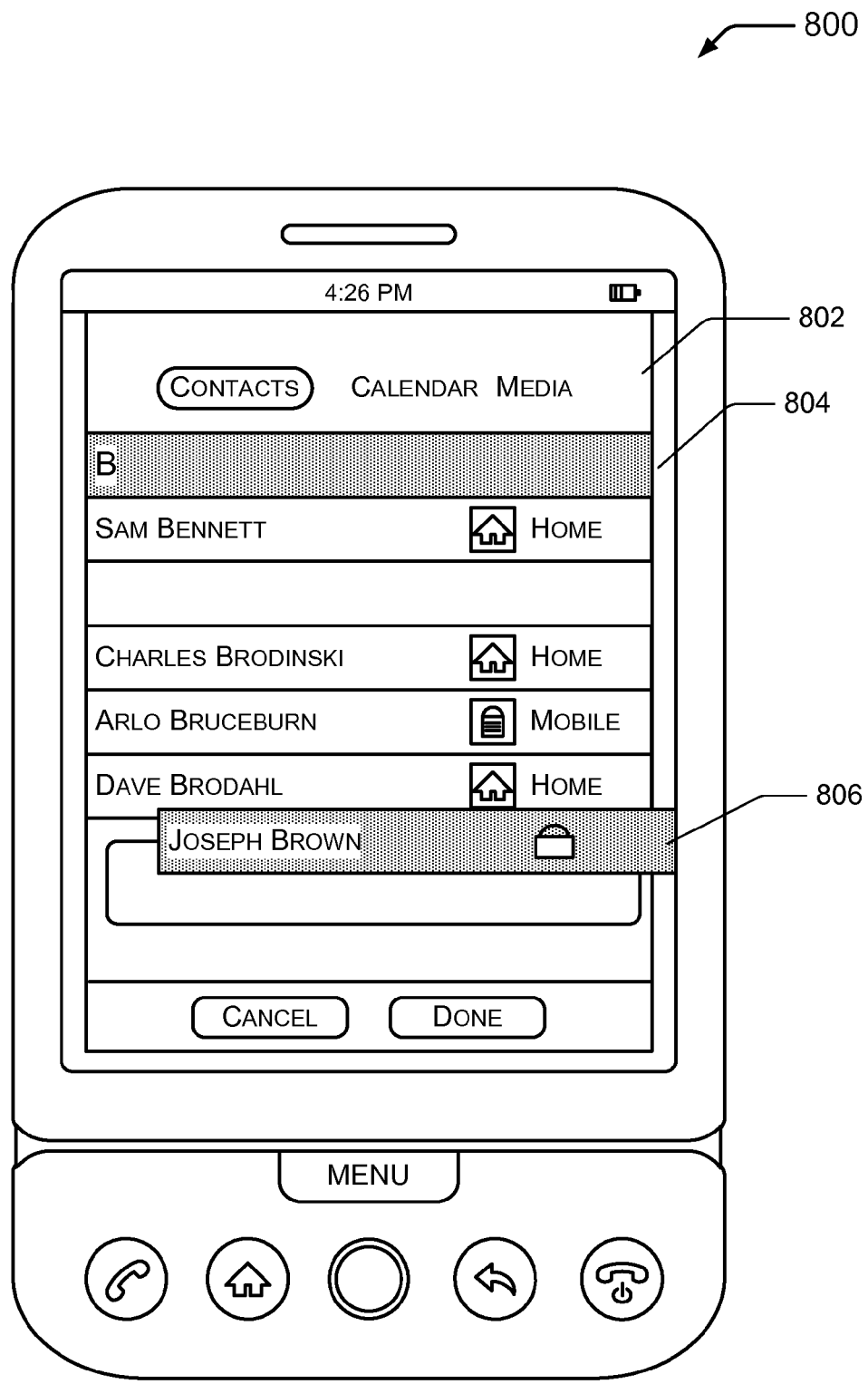
FIG. 8 is a schematic showing an exemplary sender user interface for adding a contact for direct voicemailing.

FIG. 8 illustrates an exemplary sender user interface 800 for adding contacts on the sending telecommunications device 102. The user interface 800 illustrates a list of contacts 802 stored in memory of the telecommunications device 102. In this graphic user interface 800, the sender 104 desires to send the voicemail message to individuals starting with the last name B shown at 804. The sender 104 indentifies Joseph Brown 806 as the contact to receive the direct voicemailing from the sending telecommunications device 102. The sender 104 may hit Cancel to not add the contact, Joseph Brown, or Done 806 to select the contact, Joseph Brown on the sending telecommunications device 102.

Figure 9:
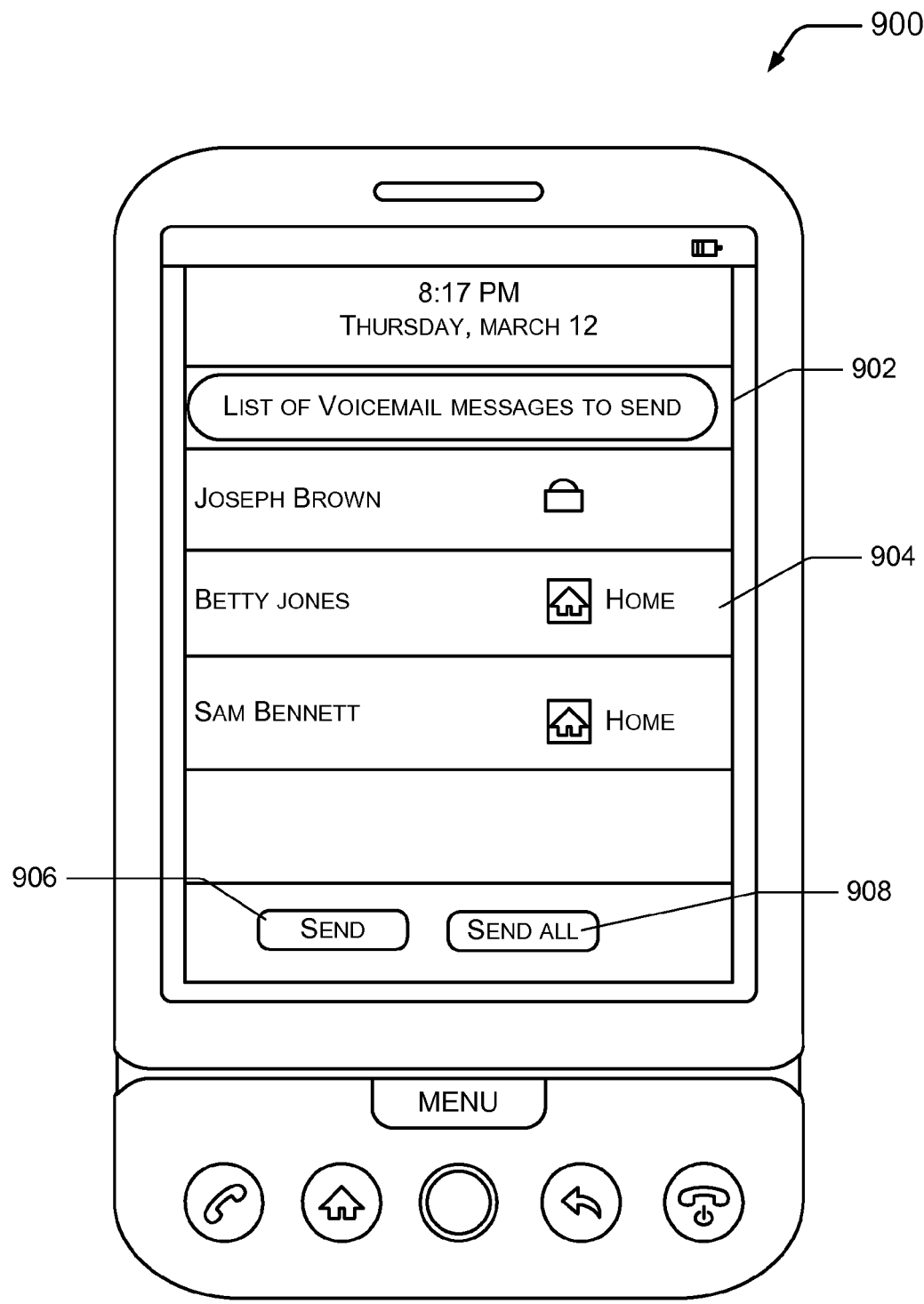
FIG. 9 is a schematic showing an exemplary sender user interface for displaying a list of contacts to send voicemail messages for direct voicemailing.

FIG. 9 illustrates an exemplary sender user interface 900 for displaying the list of contacts to receive the stored voicemail messages on the sending telecommunications device 102 for subsequent transmission or to receive the voicemail messages being directly transmitted to the voice mailbox 120. In an implementation, there may not be an asynchronous communication session, so the voicemail message would be recorded and stored on the telecommunications device 102 for subsequent transmission. The title bar may indicate "List of Voicemail Messages to Send" 902 on the sending telecommunications device 102.

In an implementation, the voicemail messages may be subsequently transmitted to the voicemail box 120 of the receiving telecommunications device 116 upon the sending telecommunications device 102 capable of engaging in an asynchronous communication session. In another implementation, the sender 104 may have determined and identified conditions for a scheduled date and a time to subsequently transmit the voicemail messages from the sending telecommunications device 102 to the voice mailboxes of the receiving telecommunications devices. Yet, in another implementation, the telecommunications device 102 has permission and rules to allow voice communication and has a strong connection to directly transmit the voicemail message.

The user interface 900 would permit the sender 104 to record several voicemail messages for different contacts, then subsequently transmit the voicemail messages from the sending telecommunications device 102 to the voice mailboxes when there is a stable connection for the telecommunications device 102. In one example, the direct voicemailing could be used by the sender 104 to record multiple voicemail messages on the sending telecommunications device 102, when the sending telecommunications device 102 does not have a connection to a voice communication channel. Once the sending telecommunications device 102 has a connection strength falling within a predetermined range, the voicemail messages are subsequently transmitted from the sending telecommunications device 102 to the voice mailboxes of the receiving telecommunications devices.

As shown, when the sender 104 has recorded voicemail messages and identified the contact(s) to send the voicemail messages to, the sender 104 may send the voicemail message to a single individual contact. For example, the sender 104 will highlight the name of Betty Jones 904 and then activate the Send button 906 to transmit the direct voicemail to her only. In another implementation, the sender 104 may have recorded several or different voicemail messages to send to direct voicemail for several individuals. The sender 104 will activate the Send All feature 908 to transmit the direct voicemails to the list of individuals shown.

Exemplary Process Implementations

Figure 10:
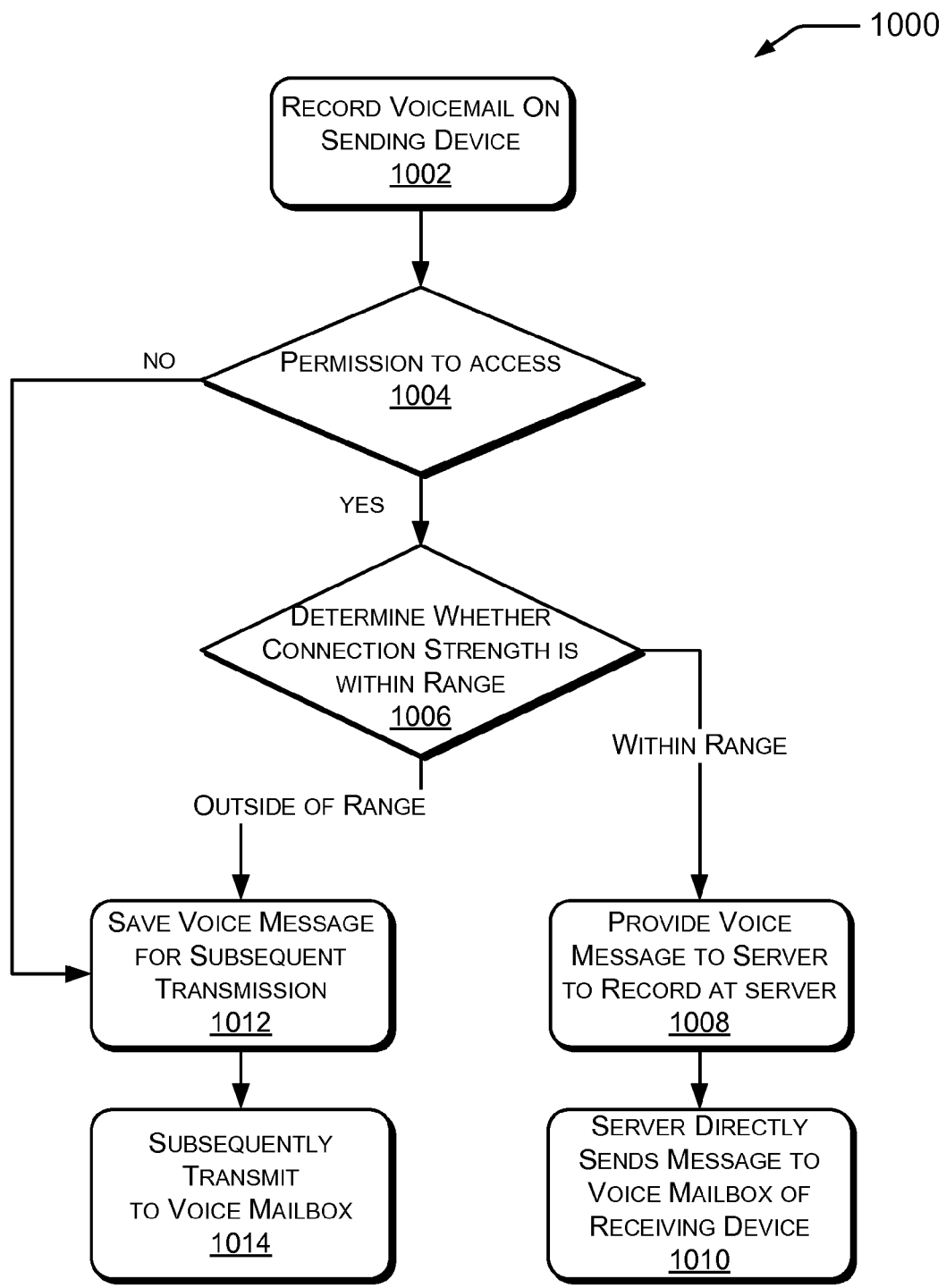
FIG. 10 is a block diagram of a flowchart showing an exemplary process for creating the voicemail for direct voicemailing.

FIGS. 10 and 11 are flowcharts showing exemplary processes for creating and sending the direct voicemailing 1000 by the sending telecommunications device 102 and for receiving the direct voicemailing 1100 on the receiving telecommunications device 116. The processes 1000 and 1100 are illustrated as a collection of blocks in a logical flow graph, which represents a sequence of operations that can be implemented in hardware, software, or a combination. For discussion purposes, the processes 1000 and 1100 are described with reference to the computing environment 100 shown in FIG. 1 and computer implementations shown in FIGS. 2 and 3.

FIG. 10 is a block diagram of a flowchart showing an exemplary process 1000 for creating a voicemail on the sending telecommunications device 102. In an implementation, block 1002 represents the sender 104 recording a voicemail message on the sending telecommunications device 102 to be directly sent or subsequently transmitted to the voice mailbox 120 of the receiving telecommunications device 116. In an implementation, the sender 104 may have tried to contact the recipient 118 but the sending telecommunications device 102 did not have service, as was shown in the FIG. 5. In another implementation, the sender 104 may decide to leave a voicemail message without initiating a synchronous voice communication to the recipient telecommunications device 116.

Block 1004 represents determining whether permissions or rules allow the sending telecommunications device 102 to engage in an asynchronous communication session 110. The permission or rules may include permissive constraints that may be specified on the sending telecommunications device 102, by another device or by the server 114. If there is no permission, the sender 104 may record a voicemail locally on the telecommunications device 102, for subsequent transmission to the direct voice mailbox 120, proceeding to block 1012. If there is permission, the sending telecommunications device 102 proceeds to determine whether there is a connection to a voice communication channel 1006.

Block 1006 represents determining the connection strength for the sending telecommunications device 102 on the voice communication channel, by the connection strength module 214. The determining can include, for example, checking the connection strength on a predetermined time interval, such as once a second, and updating a user interface icon to indicate the connection strength to the sender 104.

Block 1006 further represents a decision point of whether the connection strength is within a predetermined connection strength range or above a threshold. For example, if the connection strength module detects the connection strength is within a connection strength range, such as a frequency band about 850 to 900 MHz and about 1850 to 1990 MHz, the process 1000 proceeds to the "Within Range" branch along the right side of FIG. 10.

The process 1000 proceeds to permit the sender 104 to record the voicemail message through a microphone located on the sending telecommunications device 102. In some implementations, the direct voicemail application converts the voicemail to digital form and streams it to the remote voicemail server 114 as shown in block 1008. In some implementations, the voicemail may be streamed from the sending telecommunications device 102 to the remote voicemail server 114 as it is recorded, while in other implementations, the voicemail may be recorded locally and then transmitted upon completion of the recording. The remote voicemail server 114 will directly send the voicemail message from the sending telecommunications device 102 to the voicemail box 120 of the receiving telecommunications device 116, without initiating a synchronous voice communication to the receiving telecommunications device 116. In some implementations, this may be accomplished by having the sender 104 call a private access number 122 associated with the voice mailbox 120. In other implementations, the sending telecommunications device 102 may call a phone number used to ring the receiving telecommunications device 116 but provide an indication to the remote voicemail server that the call is a directed voicemail. The remote voicemail server 114 may then deliver the voicemail to a voice mailbox 120 associated with the phone number.

Returning to block 1006, if the connection strength module detects that the connection strength is outside of range for the connection strength range, the process 1000 proceeds to the "Outside of Range" branch along the left side of FIG. 10.

As shown in block 1012, the process 1000 proceeds to permit the sender 104 to record and to save the voicemail message on the sending telecommunications device 102, even without a connection or service. The sender 104 records the voicemail message through a microphone and saves the voicemail message on the sending telecommunications device 102.

In an implementation, the voicemail message may be converted to a digital file for a clear voicemail message.

Block 1014 illustrates the process 1000 will subsequently transmit the voicemail message from the sending telecommunications device 102 to the voice mailbox 120 of the receiving telecommunications device 116. In an implementation, the voicemail message is subsequently transmitted as soon as the connection strength is within the predetermined range (e.g., when there is an immediate-strength or strong signal) on the sending telecommunications device 102. In another implementation, the voicemail message is subsequently transmitted at a scheduled date and a time determined by the sender 104 of the sending telecommunications device 102 if the connection strength is within the predetermined range.

In an implementation, the direct voicemailing application program 106 may associate a default position of subsequently transmitting the voicemail message from the sending telecommunications device 102 to the voice mailbox 120 of the receiving telecommunications device 116 upon detecting a signal for telecommunications service for the sending telecommunications device 102. If the default position is to subsequently transmit any recorded voicemail messages from the sending telecommunications device 102, this does not require the sender 104 to schedule the date and time for delivery on the sending telecommunications device 102. For example, the sender 104 may record several voicemail messages for business associates on the sending telecommunications device 102 while on a trip with no service available for the sending telecommunications device 102. Once the sending telecommunications device 102 receives the signal for telecommunications services, the voicemail messages are subsequently sent from the sending telecommunications device 102 to the voice mailbox 120 of the receiving telecommunications device 116.

FIG. 11 is a block diagram of a flowchart showing an exemplary process 1100 for receiving the direct voicemailing in the voice mailbox 120 of the receiving telecommunications device 116. The direct voicemailing application 106 offers options to receive a typical voicemail, which is known by one of ordinary skill in the art, and the direct voicemailing process, as described above. In an implementation, the two options for voicemails may identify conditions for the receiving telecommunications device by the recipient 118. In some implementations, the sending telecommunications device 102 may be configured to act as a receiving telecommunications device 116 and may perform the operations illustrated in FIG. 11 when receiving voicemails for other telecommunications devices.

Typically, the recipient 118 receives a ring on the receiving telecommunications device 116 for a call. As shown in 1102, the process identifies "ring receiving telecommunications device?". If there is a ring, the process 1100 proceeds to the "Yes" branch along the left side of FIG. 11.

Block 1104 represents the ringing of the receiving telecommunications device 116 that occurs with typical voicemail. The sender 104 attempts to first ring the receiving telecommunications device, but the recipient 118 is not available to receive the call. Thus, the sender 104 is given an option to leave a typical voicemail message that is sent to the voice mailbox 120 of the receiving telecommunications device 116 of the recipient 118, which may have the same telecommunications number as the receiving telecommunications device 116.

Returning to block 1102, if the receiving telecommunications device does not ring, the process proceeds along the "No" branch to block 1106.

Block 1106 represents directly sending the voicemail message from the sending telecommunications device 102 to the voice mailbox 120 of the receiving telecommunications device. As mentioned previously, the voice mailbox 120 may be associated with a private access telecommunications number 122 for direct voicemailing that is not shared or shown to the sender 104.

Block 1108 represents the recipient 118 receives the voicemail message in the voice mailbox 120 of the receiving telecommunications device 116, without first having been called by the sending telecommunications device 102.

In an implementation, decision block 1110 represents whether to "send notification to the receiving telecommunications device?". The notification is for a received voice message in the voice mailbox 120 of the receiving telecommunications device 116. If a notification is sent to the receiving telecommunications device 116, the recipient 118 may have set up conditions for the direct voicemailing application 106 to send the notification or an alert for the voice mailbox 120 associated with the private access number 122 as shown in block 1112.

Returning to block 1110, the process 1100 determines whether "send notification to the receiving telecommunications device?". If the process 1100 does not send the notification, the process 1100 moves along the "No" branch. This is the default position to not send any type of notification after receiving the directed voicemailing message in the voice mailbox 120 that is associated with the private access telecommunications number 122. An advantage of not receiving the notification is to avoid being disturbed.

At block 1114, the process 1100 proceeds to permit the recipient 118 to access the voicemail message in the voice mailbox 120 of the receiving telecommunications device 116. The recipient 118 may retrieve the voicemail message by calling a separate telecommunications number, rather than the typical voicemail option that has the same telecommunications number as the receiving telecommunications device 116.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
recording on a sending telecommunications device, by the sending telecommunications device, a directed voicemail message for direct voicemailing to a voice mailbox of a receiving telecommunications device, without initiating a synchronous voice communication with the receiving telecommunications device;
sending or subsequently transmitting, by the sending telecommunications device, the directed voicemail message from the sending telecommunications device to the voice mailbox of the receiving telecommunications device;
determining if the sending telecommunications device is capable of engaging in an asynchronous communication session;
in response to determining that the sending telecommunications device is capable of engaging in the asynchronous communication session, recording the directed voicemail message to a remote voicemail server; and
in response to determining that the sending telecommunications device is not capable of engaging in the asynchronous communication session, recording the directed voicemail message on the sending telecommunications device for subsequent transmission.

2. The method of claim 1, wherein the sending or subsequently transmitting comprises sending or subsequently transmitting the directed voicemail to the voice mailbox without sending a notification to the receiving telecommunications device.

3. The method of claim 1, further comprising comparing a connection strength of the sending telecommunications device to (1) a range comprising a frequency band about 850 to 900 MHz and about 1850 to 1990 MHz or (2) a threshold.

4. The method of claim 1, further comprising determining if rules or permissions allow the sending telecommunications device to access an asynchronous communication session.

5. The method of claim 1, wherein sending or subsequently transmitting the directed voicemail message from the sending telecommunications device comprises routing or delivering the directed voicemail message to an assigned private telecommunications number for an asynchronous communication session to the voice mailbox of the receiving telecommunications device, and the assigned private telecommunications number for the receiving telecommunications device is different than a telecommunications number for synchronous voice communication with the receiving telecommunications device.

6. The method of claim 1, wherein sending or subsequently transmitting the directed voicemail message from the sending telecommunications device comprises scheduling a date and a time to deliver the directed voicemail message to the voice mailbox of the receiving telecommunications device.

7. The method of claim 1, further comprising:
recording and storing a plurality of directed voicemail messages on the sending telecommunications device; and
subsequently transmitting the plurality of directed voicemail messages to a plurality of voice mailboxes of a plurality of receiving telecommunications devices.

8. One or more computer-readable storage media encoded with instructions that, when executed on a processor, are configured to perform acts comprising:
determining if an asynchronous communication session is available for a sending telecommunications device;
in response to determining that the asynchronous communication session is not available for the sending telecommunications device, recording, by the sending telecommunications device, a voicemail message on the sending telecommunications device;
visually displaying a connection strength for the sending telecommunications device prior to recording the voicemail message, to predict when the voicemail message will be delivered to the voice mailbox of the receiving telecommunications device; and
subsequently transmitting, by the sending telecommunications device, the voicemail message from the sending telecommunications device to a voice mailbox of a receiving telecommunications device when the asynchronous communication session becomes available for the sending telecommunications device.

9. The one or more computer-readable storage media of claim 8, wherein the subsequently transmitting the voicemail message from the sending telecommunications device to the voice mailbox of the receiving telecommunications device comprises scheduling a date and a time to send the voicemail message.

10. The one or more computer-readable storage media of claim 8, wherein the voice mailbox of the receiving telecommunications device is associated with a private telecommunications number.

11. The one or more computer-readable storage media of claim 8, further comprising retrieving, by the sending telecommunications device, a voicemail message sent to the sending telecommunications device by calling a direct voice mailbox telecommunications number associated with the sending telecommunications device.

12. The one or more computer-readable storage media of claim 11, further comprising receiving the voicemail message in a voice mailbox of the sending telecommunications device without the sending telecommunication device first receiving a synchronous voice communication or a notification.

13. The one or more computer-readable storage media of claim 8, wherein determining if the asynchronous communication session is available further comprises (1) comparing a connection strength of the sending telecommunications device to a range or a threshold or (2) determining whether rules or permissions allow the sending telecommunications device to engage in the asynchronous communication session.

14. A sending telecommunications device comprising:
a processor; and
executable instructions to be operated by the processor to implement a user interface, the user interface enabling a user to:
record a voicemail message on the sending telecommunications device without being able to engage in an asynchronous communication session;
identify a contact for the voicemail message; and view an indicator of whether the asynchronous communication session is available for the sending telecommunications device for a subsequent transmission of the voicemail message to a voice mailbox of a receiving telecommunications device associated with the contact, wherein the sending telecommunications device determines whether the asynchronous communication session is available by (1) comparing a connection strength of the sending telecommunications device to a range or a threshold or (2) determining whether rules or permissions allow the sending telecommunications device to engage in the asynchronous communication session.

15. The sending telecommunications device of claim 14, wherein the user interface further displays a message of no service on the sending telecommunications device while displaying an option to leave a voice mail message.

16. The sending telecommunications device of claim 14, wherein the user interface further displays a list of recorded voicemail messages to subsequently transmit from the sending telecommunications device to a plurality of voicemail boxes of a plurality of receiving telecommunications devices, upon a determination that the sending telecommunications device is capable of engaging in the asynchronous communication session.

* * * * *